(No Model.)
C. J. EAMES.
REDUCING IRON ORE.
No. 404,182. Patented May 28, 1889.
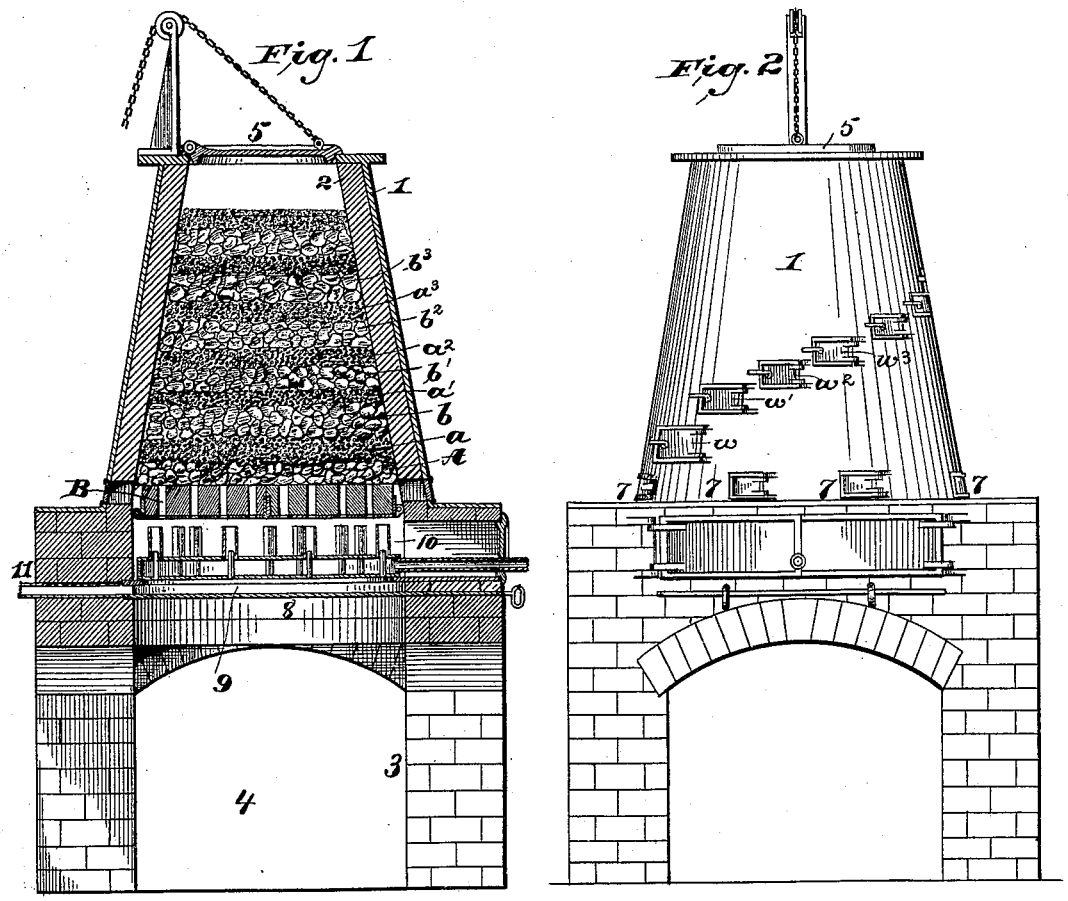
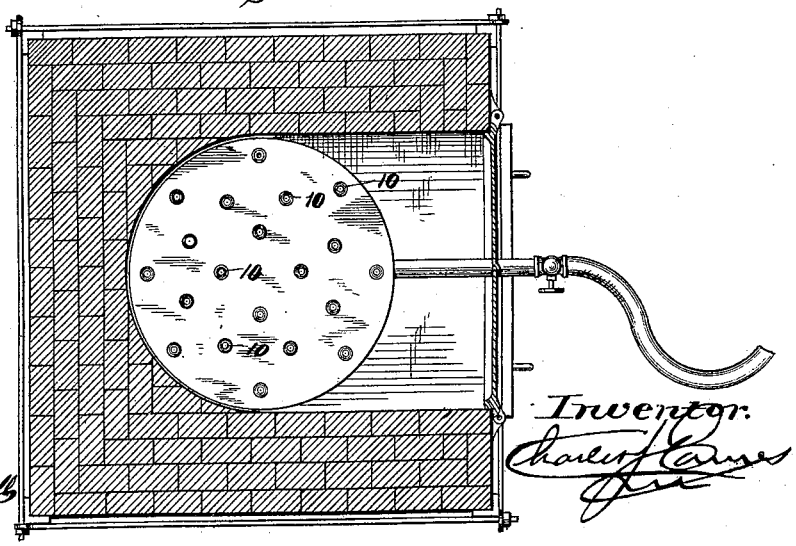

UNITED STATES PATENT OFFICE.

CHARLES J. EAMES, OF NEW YORK, N. Y.

REDUCING IRON ORE.

SPECIFICATION forming part of Letters Patent No. 404,182, dated May 28, 1889.

Application filed January 19, 1889. Serial No. 296,837. (No model.)

*To all whom it may concern:*

Be it known that I, CHARLES J. EAMES, a citizen of the United States, residing at New York city, in the State of New York, have invented certain new and useful Improvements in Reducing Iron Ore for the Manufacture of Wrought-Iron, Steel, &c., Direct from the Ore; and I hereby declare the following to be a full, clear, and exact description of the invention, such as will enable others skilled in the art to which it appertains to apply the invention.

Heretofore in the reduction of iron ore for the manufacture of spongy iron by the direct process of manufacturing iron and steel two processes have been most commonly practiced—viz., that wherein the material in a closed retort was subjected to heat by radiation or induction and that wherein the heating medium was passed over or through the material and in direct contact therewith. The first of these methods is limited in the quantity of its output and inefficient in operation to such an extent as to have been virtually abandoned as a practical thing for maufacturing purposes. The second of these methods, which may be said to embrace both the roasting or reverberatory and the stack processes, or to partake of the character of both, has been wasteful of carbon and so hard to properly control the temperatures as to render the results too uncertain for practical manufacturing purposes. Heretofore it has been sought to control this last-recited method either by the admixture of lime and other fluxes or by means which would retard and prevent the rapid combustion of the carbon and the consequent fusion of the mass before thoroughly deoxidized.

My present invention relates to the last-recited method, or that in which the heating medium permeates or passes through the mass of iron ore and reducing agent, and has for its object to avoid the use of lime or equivalent flux or of any intermediate substance for preventing the too rapid combustion of the reducing agent, and to so control the neutral heat, the neutral-heat-carrying medium, and its application to the iron ore under treatment, and the carbon admixed therewith that too rapid combustion of the reducing agent cannot occur. This can be readily accomplished by certain character or quality of reducing agent and stratification of the material under treatment, and certain conditions and quality of the heating media, all of which is readily obtained and is embraced in my invention, as will hereinafter more fully appear.

I will now proceed to describe my invention more fully, so that others may apply the same, and for this purpose I have shown apparatus which may be employed, though any other apparatus applicable to the purpose may be used.

In the drawings, Figure 1 is a vertical central section of a stack and its adjuncts suitable for carrying out my process. Fig. 2 is an elevation of the same, and Fig. 3 is a plan view of the gas-burner I prefer to employ.

Like symbols of reference refer to like parts wherever they occur.

The apparatus shown in the drawings consists of a stack having an outer shell, 1, of tapering form, lined with fire-brick, 2, and supported on an arched base, 3, to provide a pit, 4, beneath the stack. The stack at its top may be provided with a damper, 5, and at its bottom with a drop-grate, 6, while at suitable intervals in its side are a series of working-doors, $w$ $w'$ $w^2$, &c., arranged in step form, and encircling its base is a series of small air-ports, 7, which may be closed by doors or fire-brick plugs, as desired.

In the base 3, below the grate 6, is arranged a slide, 8, which may be withdrawn for purposes of draft or inserted to form a chamber, 9, below said grate. Within said chamber 9 is a gas-burner, 10, preferably of the Bunsen pattern, so contrived that it can be drawn out of chamber 9 through an opening at one side whenever the grate 6 is to be dropped to dump the charge from the stack.

11 indicates a blast-pipe, which may deliver into chamber 9, and will be found serviceable in producing initial combustion at the base of the stack, reviving the fire if low, and in case of accident preventing the scaffolding of the charge in the stack.

The heating and heat-conveying medium is preferably gas, either "natural" or artificial, (gas-producer gas,) vaporized petroleum, or the equivalents thereof.

The reducing agent which is admixed with the iron ore is graphitic carbon—such as is found at Cranston, Rhode Island, and in other localities—in a granulated condition. The intermediate layers which separate the strata of iron ore are preferably Connellsville coke, or any equivalent coke which is of strong structure and pure quality.

In carrying out my invention I prefer to arrange upon grate 6 a layer of broken fire-brick, B, or equivalent refractory material, so as to obtain a heat-storing open or reticulated mass to receive and spread the gas, and on top thereof a layer, A, of lump coke or equivalent carbon lumps, which will prevent contact between the lower stratum of iron ore under treatment and the fire-brick or other refractory material. When this has been done, the gas may be admitted to the burner 10 and ignited in chamber 9 by means of the natural draft produced when slide 8 is withdrawn or by means of a blast through pipe 11. The fire is thus maintained until the layer of broken fire-brick B is highly heated and the layer of carbon A is incandescent. The slide 8 is then inserted to close chamber 9, or (if the slide has not been withdrawn to use the natural draft) the blast through pipe 11 is cut off and the gas temporarily cut off while the stack is being charged. The stack is then charged as follows: A stratum, $a$, of iron ore and the reducing agent in granular form, and admixed so that there will be anywhere from twenty per cent. to forty per cent. of the reducing agent present, (graphitic carbon being the preferred form for the reducing agent,) is spread upon carbon layer A until the said stratum $a$ is from two (2) to four (4) inches thick. Next, a layer, $b$, of lumps of carbon only, which will form an open-work or reticulated stratum of between three (3) and six (6) inches thick, is placed on the stratum $a$, and this is followed in alternation by successive layers $a'$ $b'$ $a^2$ $b^2$, &c., which correspond with the layers $a$ and $b$ before specified. The alternate layers are continued up until within six or eight inches of the top of the stack is reached. These layers can be spread and arranged either from the top of the stack or through the working-doors $w$ $w'$ $w^2$, &c., as the gas is at this time cut off, as before specified.

When the stack has been thus charged, the gas is again turned on at the burners and allowed to flow from chamber 9 into the reticulated stratum B, where it is supplied with only a limited amount of air, which enters through air-ports 7 and induces low combustion sufficient to maintain the heat and generate carbonic oxide, which gas permeates the superimposed layers $a$ $a'$ $a^2$, &c., and effects the reduction of the ore gradually and perfectly without unduly consuming the carbon or inducing overheating of the mass under treatment.

The pressure in the stack during the working of the process should be sufficiently great to prevent any leaking or entrance of the external atmosphere into the stack, and it should also be attended to that no more air enters at the ports 7 than is necessary to support low combustion, as any excess of air interferes materially with the process. While a deficiency of air may retard the process, it does not produce bad results.

The close of the process, or complete reduction of the ore, may be determined by examining the top layer of iron ore and granulated carbon, and will be easily ascertained by indications well understood by those skilled in the art.

As soon as the process is completed the damper 5 may be lowered to prevent draft through the pit, the slide 8 and burner 10 withdrawn, and the grate 6 lowered to dump the charge into pit 4, where it will cool, surrounded by a neutral gas, which will prevent oxidation of the spongy mass.

The unconsumed carbon may be raked from the mass and used in subsequent charges. The fire-brick or refractory mass B can be at once replaced and the stack reheated for the reception of a new charge.

I do not herein claim the apparatus shown and described, or any part thereof, as so much thereof as is novel and patentable has been made the subject of another application, Serial No. 296,840, filed of even date herewith. Neither do I herein claim a process of reduction for iron ore, which consists in subjecting alternate strata or layers of admixed granulated iron ore and granulated carbon and layers of lump carbon to the action of currents of heated carbonic oxide, which are caused to permeate and pass through said strata, as the same forms the subject-matter of an application, Serial No. 296,836, also filed of even date herewith; but,

Having thus described my invention, what I claim, and desire to secure hereby, is—

1. The process herein described for reducing iron ore, which consists in arranging a series of layers composed alternately of lump carbon alone and granulated graphitic carbon mixed with granulated iron ore to currents of highly-heated carbonic-oxide gas, which permeate the several strata, substantially as and for the purposes specified.

2. The process herein described for reducing iron ore, which consists in arranging a series of layers composed alternately of lump carbon alone and granulated graphitic carbon admixed with granulated iron ore and subjecting the said layers to gaseous products in which a low state of combustion has been induced, said products being caused to permeate the several alternately-arranged layers of carbon alone and granulated iron ore mixed with granulated graphitic carbon, substantially as and for the purposes specified.

In testimony whereof I affix my signature, in presence of two witnesses, this 19th day of January, 1889.

CHARLES J. EAMES.

Witnesses:
E. T. WALKER,
F. R. CORNWALL.